United States Patent
Weber

(10) Patent No.: US 6,990,716 B2
(45) Date of Patent: Jan. 31, 2006

(54) DEVICE FOR SUPPLYING A CONNECTING ELEMENT TO A PROCESSING UNIT AND METHOD OF SUPPLYING THE CONNECTING ELEMENT

(75) Inventor: Gotthard Weber, Regensburg (DE)

(73) Assignee: Richard Berger Verbindungstechnik GmbH & Co. KG, Schwabach (DE)

( * ) Notice: Subject to any disclaimer, the term of this patent is extended or adjusted under 35 U.S.C. 154(b) by 0 days.

(21) Appl. No.: 10/864,274

(22) Filed: Jun. 8, 2004

(65) Prior Publication Data

US 2004/0231144 A1    Nov. 25, 2004

Related U.S. Application Data

(63) Continuation of application No. PCT/EP02/13888, filed on Dec. 7, 2002.

(30) Foreign Application Priority Data

Dec. 8, 2001    (DE) ................ 101 60 423

(51) Int. Cl.
*B23P 11/00* (2006.01)
*B23P 21/00* (2006.01)

(52) U.S. Cl. ................. 29/432; 29/715; 29/714; 29/712

(58) Field of Classification Search .......... 29/715, 29/716, 798, 432, 709, 809, 822, 243.5, 243.52, 29/243.53; 414/179, 224; 221/278, 289, 221/68, 124, 123, 234, 271–276, 298, 299, 221/296, 294, 236, 168

See application file for complete search history.

(56) References Cited

U.S. PATENT DOCUMENTS

| | | | | |
|---|---|---|---|---|
| 3,114,477 A | * | 12/1963 | Dixon | ............... 221/238 |
| 3,297,199 A | * | 1/1967 | Law | ............... 221/93 |
| 4,348,796 A | | 9/1982 | Smallegan | |
| 5,360,137 A | | 11/1994 | Shinjo et al. | |
| 5,887,339 A | | 3/1999 | Schmidt | |

FOREIGN PATENT DOCUMENTS

| | | |
|---|---|---|
| DE | 198 23 040 A1 | 11/1999 |
| EP | 0 758 285 B1 | 2/1997 |
| EP | 0 864 369 A2 | 9/1998 |
| WO | 95/11770 | 5/1995 |
| WO | 95/30513 | 11/1995 |

* cited by examiner

*Primary Examiner*—John C. Hong
(74) *Attorney, Agent, or Firm*—Laurence A. Greenberg; Werner H. Stemer; Ralph E. Locher

(57) ABSTRACT

A device supplies a connecting element to a processing unit, in particular supplies punch nuts or rivet nuts to a punching head of a press, by a conveyer belt. The device contains a feed element, which has a flap that can be displaced in the conveyer belt and has a feed surface. The flap is retained in the conveyer belt by a passive force. The flap can be withdrawn or displaced from the conveyer belt by a connecting element that has been supplied to the belt and causes sensor actuation.

18 Claims, 2 Drawing Sheets

DEVICE FOR SUPPLYING A CONNECTING ELEMENT TO A PROCESSING UNIT AND METHOD OF SUPPLYING THE CONNECTING ELEMENT

CROSS-REFERENCE TO RELATED APPLICATION

This application is a continuation, under 35 U.S.C. § 120, of copending international application No. PCT/EP02/13888, filed Dec. 7, 2002, which designated the United States; this application also claims the priority, under 35 U.S.C. § 119, of German patent application No. 101 60 423.8, filed Dec. 8, 2001; the prior applications are herewith incorporated by reference in their entirety.

BACKGROUND OF THE INVENTION

1. Field of the Invention

The invention relates to a device and a method for supplying a connecting element to a processing unit. A device of this generic type is disclosed, for example, by U.S. Pat. No. 4,348,796 A.

Connecting elements such as punch nuts, rivet nuts or press-in nuts are frequently connected to a work piece, for example to a metal sheet, in a processing machine, in particular in a press. In this case, during the joining operation in the press, the punch nut itself punches a hole in the metal sheet, while the rivet nut or the press-in nut is inserted into an opening already present in the metal sheet. The nuts are in each case first separated before being supplied to the press and, in accordance with the cycle rate of the latter, are supplied to a setting head incorporated in the press as a processing unit or fitted to the press. Presses of this type are used in particular in mass production, for example in the automobile industry, particular importance being attached to a fast process cycle and to interruption-free, reliable operation.

A device for transferring connecting elements to setting heads in a press is disclosed, for example, by Published, Non-Prosecuted German Patent Application DE 198 23 040 A1. In this case, the connecting elements are supplied by a sorting and conveying device, via a guide implemented as a guide hose, to a lower tool part of the press. From the latter, the connecting elements are transferred to the upper tool part via a transfer device and from there are distributed onward by a distribution station. The transfer of the connecting elements between the lower and upper tool part can be carried out only at the upper dead center of the press. The output of the press, that is to say the cycle rate that can be achieved, is severely restricted in this way.

European Patent EP 0 758 285 B1, corresponding to U.S. Pat. No. 5,887,339, discloses a device in which, in each case, a connecting element arrives in a loading position in a conveying section by being shot in via a hose. From the loading position, the connecting element is pushed further into the conveying section by a forward thrust element. A plurality of connecting elements is therefore lined up directly in a row in the conveying section being located as far as a setting head. The device is intended to permit a high number of strokes per unit time in a press, in that a sufficiently long period of time is available for reloading the connecting elements, for example nuts. For this purpose, the forward thrust element is normally in an ineffective position, what is known as a normal position, completely outside the conveying section. This results in that the forward thrust element is moved only to reload connecting elements into the conveying section and pushes the connecting elements lined up in a row in the direction of the press. In order to actuate the forward thrust element, the latter has a pneumatically actuated cylinder, whose piston acts via a pin in a slot in a forward thrust rocker, which can be pivoted into the conveying section through a slot. If the connecting element is unfavorably positioned in the conveying section, then there is the risk of blocking the forward thrust rocker during the attempt to pivot the latter into the conveying section. Furthermore, there is the disadvantage that, before a connecting element is shot in pneumatically, the forward thrust rocker has to be removed from the conveying section by actuating the pneumatic cylinder.

A supplying device for connecting elements, namely nuts, disclosed by U.S. Pat. No. 4,348,796, has a conveying section in which a spring-loaded pawl can engage, which is part of a forward thrust mechanism which operates with a hydraulic or pneumatic cylinder. During the reverse movement of the forward thrust mechanism, the pawl is displaced out of the conveying section by the nuts located in the conveying section and is drawn over the nuts. During the forward thrust of the nuts, on the other hand, the ratchet is always in its position engaging in the conveying section. The nuts are introduced into the supplying device, for example, in the form of continuous strips. Likewise, the nuts can be connected to one another by wires that can easily be divided.

A further supplying device for nuts is disclosed, for example, by U.S. Pat. No. 5,360,137. In this case, nuts which are supplied to a distributing device in a first direction are distributed into various channels in each case running at right angles to the supply direction by a number of forward thrust elements.

SUMMARY OF THE INVENTION

It is accordingly an object of the invention to provide a device for supplying a connecting element to a processing unit and a method of supplying the connecting element which overcome the above-mentioned disadvantages of the prior art devices and methods of this general type, in which the connecting elements can be supplied reliably and at a high cycle rate to a processing unit, in particular a setting head of a press.

With the foregoing and other objects in view there is provided, in accordance with the invention, a device for supplying connecting elements to a processing unit. The device contains a conveying section for holding the connecting elements, and a forward thrust element for pushing a connecting element forward in a conveying direction to the processing unit. The forward thrust element has a flap movable into the conveying section. The flap has a forward thrust surface held in the conveying section by a passively acting force and the flap is moveable out of the conveying section by the connecting element supplied to the conveying section. A sensor is provided and registers a position and/or movement of the flap. The sensor is operatively connected to the flap. A stopping element is disposed after the flap in the conveying direction, in or on the conveying section.

In this case, the forward thrust element has a flap that can be moved into a conveying section, and a forward thrust surface on which a force acts continuously and urges the flap into the conveying section. The flap can be folded or displaced out of the conveying section, counter to the continuous force, by a connecting element supplied to the conveying section.

The configuration has the advantage that, in what is known as an open position, which is its normal position, the flap projects into the conveying section. At the same time, a back stop is formed by the forward thrust surface for least one connecting element which is located after the flap in the direction of a processing unit, for example a punch head of a press. A separate back stop, which is needed in the case of the known supplying device with a normal position of a forward thrust rocker outside the conveying section, is therefore not required. Likewise, active movement of the flap back out of the conveying section, for example after the forward thrust of a plurality of connecting elements to the processing unit has been carried out, is not required. By use of the connecting element, for example introduced into the device via a supply hose by air pressure, the flap is displaced out of the conveying section into what is known as a closed position, at least to such an extent that passage of the connecting element is possible, the flap automatically assuming the open position again immediately after the passage of the connecting element. Blocking of the flap is ruled out.

According to a preferred refinement, a passive actuating element, in particular a spring element, is connected to the flap and urges the flap in the direction of its open position. Instead of the spring element, for example a weight-loaded lever or the weight of the flap itself can also be used. Likewise, the flap can be acted on directly or indirectly with compressed air. In order to damp the flap when it strikes the respective end position as it changes between its open and closed position and/or to avoid fluttering of the flap, at least one damping element can be provided.

The flap is advantageously formed in such a way that it has a ramp set obliquely with respect to the conveying section. During the introduction, in particular during the pneumatic shooting, of a connecting element into the device, the ramp is urged away laterally, for example, that is to say transversely with respect to the conveying section. The obliquely set ramp is delimited by the forward thrust surface in the conveying direction and acts as an inclined plane, which can easily be displaced out of the conveying section by the connecting element. In the conveying direction, the ramp rises, that is to say the free cross section of the conveying section tapers in the conveying direction, it being possible for the flap to be held on any desired side of the conveying section.

The flap, including the ramp, can preferably be pivoted about an axis of rotation which is located outside the conveying section in the region of the flap which is located opposite the forward thrust surface, that is to say counter to the conveying direction. In this way, the flap can be actuated particularly easily. A flap with particularly small dimensions and therefore particularly low mass can alternatively be implemented first by the flap being formed in the manner of a pin or a plate and forming a right angle with the conveying section. Second, the flap preferably covers only a small sub-area of the cross section of the conveying section but this is sufficient to act on the connecting element, so that the latter can be conveyed to the processing machine. At the same time, the small, preferably pin-like flap, disposed transversely, also serves as a back stop.

In order to use the flap with the forward thrust surface located on its front side in the conveying direction in a simple way for displacing the connecting element forward, according to a preferred refinement, a carriage which can be displaced parallel to the conveying section is provided. The flap is mounted on the carriage such that it can be moved, for example rotated or displaced transversely with respect to the conveying direction. The carriage is preferably actuated directly by a reciprocating element, for example a pneumatic reciprocating cylinder. As a result of the direct drive of the carriage, a high acceleration in the conveying direction and therefore a high cycle rate of the device can be achieved.

A connecting element resting on the forward thrust surface is conveyed to the processing machine as a result of actuation of the reciprocating element. Accordingly, a plurality of connecting elements disposed immediately one after another can be conveyed simultaneously in the direction of the processing machine. Space for new connecting elements is made by moving the carriage back. The movement of the carriage and the cycle rate of the processing machine are preferably synchronized with the introduction, in particular pneumatically actuated introduction, of new connecting elements into the device. In this case, in particular the reverse movement of the carriage counter to the conveying direction is coordinated with the introduction of new connecting elements into the device and the forward thrust movement of the carriage is coordinated with the operating cycles of the processing machine.

If a connecting element is shot into the device, it can bounce back, for example on connecting elements already located in the conveying section. In order at least to reduce this effect, according to a preferred development an actively or passively acting stopping element is provided in the conveying channel behind the flap in the conveying direction, and brakes or stops the connecting element. The stopping element is, for example, a magnet.

According to an advantageous refinement, a sensor that detects the passage of a connecting element is integrated into the flap or connected to the latter. The sensor is connected via a control unit to the processing machine and/or the parts supply, for example pneumatic parts supply, and therefore plays a central part in the synchronization of the device with the machines connected to the latter. The sensor is therefore a critical element for the control of the overall process. This is because, in conjunction with a control unit, the number of nuts lined up in a row in front of the setting head is known at every time. The supply of the setting head with nuts is ensured and operational faults in the supply of parts are detected early. In this case, it is of substantial advantage to the operational reliability that the connecting element is, so to speak, detected directly by the sensor, that is to say that the passage of the connecting element is the triggering signal for the sensor. Particularly high process reliability is provided by the flap and therefore the sensor being actuated or triggered exclusively passively by a conveyed connecting element. "Idle" actuation of the flap without the conveyance of a connecting element is ruled out.

By non-contact and indirect actuation of the sensor, which is preferably configured as a proximity switch, it is possible for example for a nonconductive or nonmagnetic connecting element to be detected. This ensures that, when the forward thrust element is actuated, a connecting element is actually conveyed to the processing unit.

Also advantageous is a preferred embodiment having a supply appliance for magazining, that is to say first for storing the connecting elements and second for supplying the connecting elements to the press. In an advantageous refinement, the supply appliance and the press are connected to each other via a hose acting as a supply line. Through the hose, the connecting elements are supplied to the press, preferably individually in each case, or even to a certain extent shot into the press. On the press side, the hose is preferably connected to a connection module. The connection module can be configured as a catching module for catching the connecting elements shot in in each case.

Furthermore, in a refinement of the invention, provision is made for a control unit for controlling the operating processes. The control unit is primarily used for synchronizing the supply appliance, forward thrust device and, ultimately, the cycling of the press. It is particularly advantageous not to provide this control appliance on the press itself but on the supply appliance, since the press is shock-loaded during each press stroke and thus parts fixed to it are set vibrating. The vibration is dispensed with by fitting the control system to the external supply appliance. For the purpose of connection between the control system, the supply appliance and the press, a plurality of lines can be provided, in particular in the form of communications or supply lines, for example in the form of signal lines or punch head control lines.

Other features which are considered as characteristic for the invention are set forth in the appended claims.

Although the invention is illustrated and described herein as embodied in a device for supplying a connecting element to a processing unit and a method of supplying the connecting element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
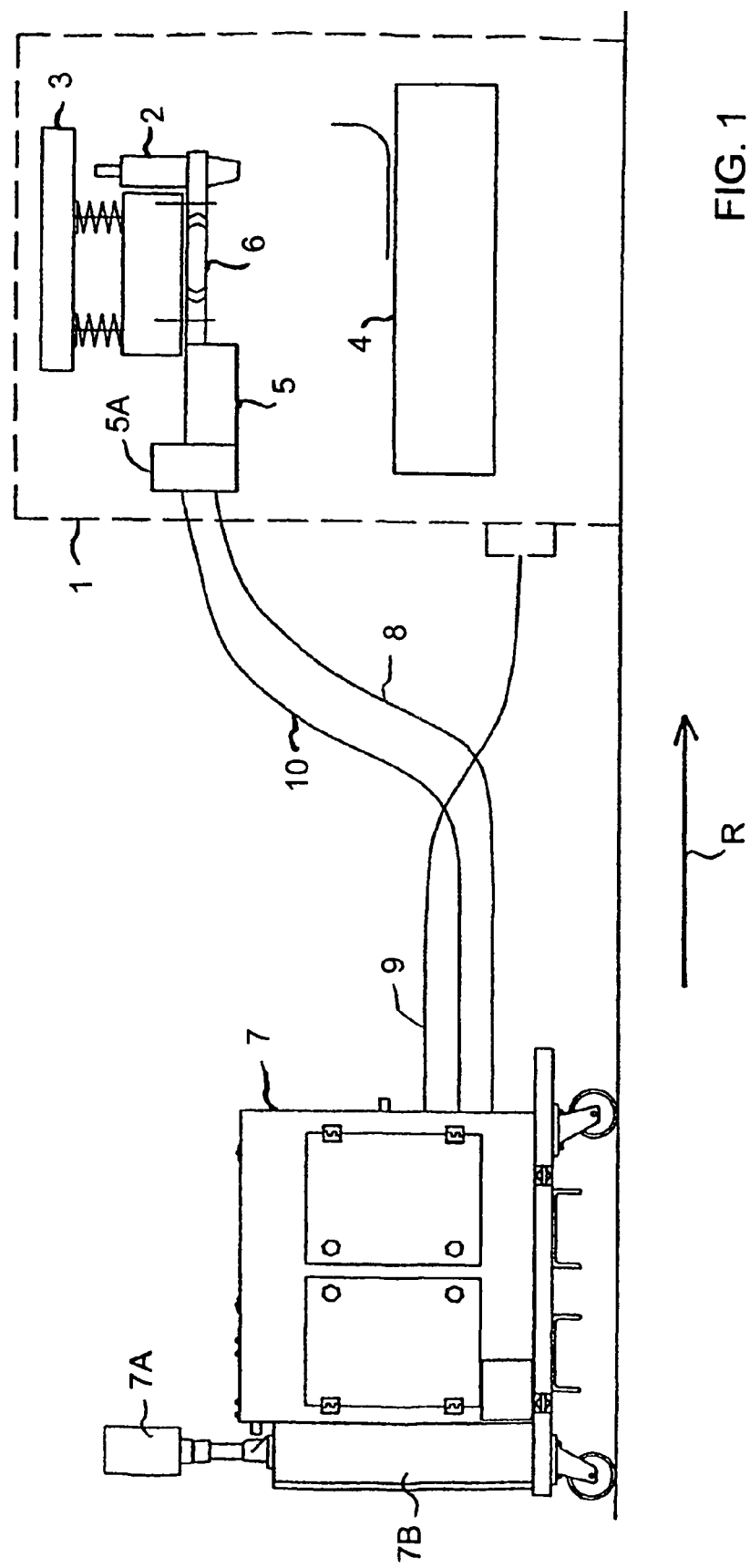
FIG. 1 is a diagrammatic illustration of a press with a punch head as a processing unit and also a part supply.

In all the figures of the drawing, sub-features and integral parts that correspond to one another bear the same reference symbol in each case. Referring now to the figures of the drawing in detail and first, particularly, to FIG. 1 thereof, there is shown as a processing machine, a press 1 having a setting head or punch head 2 as a processing unit. The press 1 has an upper tool part 3 and a lower tool part 4, to which a forward thrust device 5 is connected as a device for supplying connecting elements V (FIG. 2), for example punch nuts or rivet nuts with a round or rectangular outline. The forward thrust device 5 supplies the connecting elements V to the setting head 2, in particular constructed as a setting module 2, via a variable connecting module 6. For this purpose, the connecting module 6 is formed from individual part sections, so that different lengths can be set in a simple manner in order to permit the use of the forward thrust device 5 in a straight forward manner in different processing machines. The forward thrust device 5 contains a conveying section 11 (FIG. 2) which, in the connecting module 6, reaches as far as the punch head 2. During operation, in the conveying or collecting section, the connecting elements V are located lined up directly on one another in a defined orientation and are pushed forward to the punch head 2 in a cyclic manner controlled by the forward thrust device 5. The connecting elements V are shot pneumatically into the forward thrust device 5 in a conveying direction R from a supply appliance 7 via a hose 8, which has a cross section matched to the shape of the connecting elements V and is connected to a connection or catching module 5A connected upstream of the forward thrust device 5. The supply appliance 7, which contains a vibratory conveyor, for example, and the press 1 are also connected to each other via a signal line 9 and a punch head control line 10. Associated with the supply appliance 7, apart from an operating unit 7A, is a control unit 7B, which is used to control the operating processes and, in particular, the synchronization between the supply appliance 7, forward thrust device 5 and cycling of the press 1. In the exemplary embodiment, the control unit 7B is a constituent part of the supply appliance 7.

Figure 2:
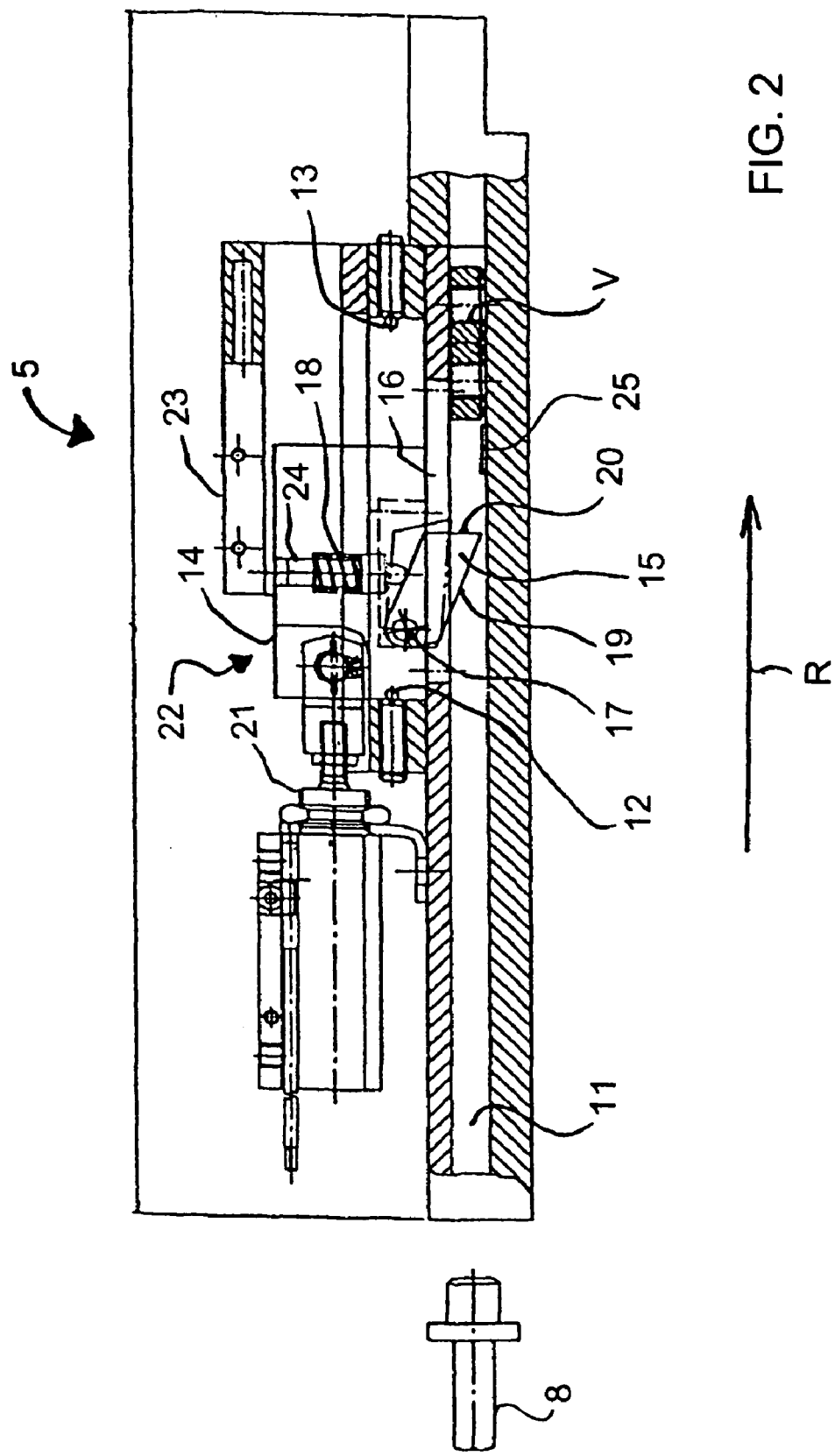
FIG. 2 is a diagrammatic, side view, of a device for supplying a connecting element to the processing unit.

The substantial function-determining parts of the forward thrust device 5 are illustrated in FIG. 2. A number of connecting elements V pass one after another in the conveying direction R through the conveying section 11, which is connected to the hose 8 (not illustrated as connected in FIG. 2). Parallel to the conveying direction R, between two stops 12, 13, it is possible to displace a carriage 14, to which a flap 15 is connected in such a way that the flap 15 can engage in the conveying section 11 through a slot 16. In the exemplary embodiment, the flap 15 is connected to the carriage 14 such that it can rotate about an axis of rotation 17. Alternatively, it can, for example, also be capable of linear displacement transversely with respect to the: carriage 14 and with respect to the conveying direction R. The flap 15 is held in the open position illustrated by a spring element 18 serving as a passive actuating element. In this case, the flap 15 first forms a ramp 19, second, in the conveying direction R, a forward thrust surface 20, which, for example, can also be degraded as an edge.

During operation, the connecting elements V are shot in individually via the hose 8 and, after passing the flap 15, are lined up in a row in front of the setting head 2 in the conveying section 11. The conveying section 11 is therefore subdivided into a portion before the flap 15, formed as a supply section for individual connecting elements V, and a portion after the flap 15, formed as a forward thrust or collecting section, in which the connecting elements lined up with one another are pushed forward to the setting head 2.

The carriage 14 with the flap 15 can be displaced by a reciprocating element 21, for example a pneumatically actuated reciprocating cylinder. Because of the direct mechanical connection between the linearly movable carriage 14 and the reciprocating element 21, likewise executing a linear movement, both fast and precise displacement of the carriage 14 are possible. The reciprocating element 21, together with the carriage 14 and the flap 15, is a constituent part of a forward thrust element 22.

As a connecting element V is conveyed in the conveying direction R by compressed air passes the flap 15, the spring 18 is compressed, the flap 15 changing into the closed position, in which it is at least largely displaced out of the conveying section 11 and is aligned approximately parallel to the carriage 14. The carriage 14 is not moved in this case. The compressed-air-actuated reloading of the connecting element V into the forward thrust device 5 is carried out under cyclic control in each case in time intervals in which the forward thrust device 5 is not conveying a connecting element V in the direction of the punch head 2.

As the flap 15 is displaced out of the conveying section 11, that is to say as the flap 15 changes from the open position into its closed position, the connecting element V sweeps under the ramp 19, so that the flap 15 rotates about the axis of rotation 17 onto the carriage 14, which is at rest. At the same time, a signal is triggered by a sensor 23 operatively connected to the flap 15. The sensor 23 is formed as a proximity switch, which, during the movement of the flap 15 from the open into the closed position, is approached by a plunger 24, which bears on the flap 15 and is guided centrally in the spring 18 formed as a helical spring. Further sensors can be provided on the stops 12, 13 in order to supply information about the position of the carriage 14 and therefore of the reciprocating element 21.

Immediately after the connecting element V, driven by compressed air, has passed the ramp 19 of the flap 15, the flap 15, actuated by the spring 18, falls back into its open position, illustrated, in which the forward thrust surface 20 lies within the conveying section 11. This open position of the flap 15 is its normal position. The forward thrust surface 20 acts on the connecting element V and pushes the latter onward in the direction of the punch head 2. After the forward stroke has been made, the carriage 14, driven by the reciprocating element 21, moves back counter to the conveying direction R in the direction of the stop 12. In this way, space to accommodate a new connecting element V in the forward thrust device 5 is free. The connecting elements V located after the flap 15 in the conveying section 11 are enclosed in this part of the conveying section 11, since the flap 15 acts simultaneously as a back stop.

In order in particular to avoid the case of a connecting element V springing back as it is shot pneumatically into the forward thrust device 5, an additional stopping element 25 can be provided—as illustrated in the exemplary embodiment—which engages in the conveying section 11 after the flap 15 in the conveying direction R. The stopping element 25, which stops or at least brakes the connecting element V, is configured to act passively, for example as a spring or spring-actuated element or as a magnetic holder, or to act actively, for example as a pneumatically actuated holding element. In addition, additional sensors can be provided in the conveying section 11 after the flap 15 and/or in the press 1, in particular in the punch head 2, which register the presence, the state of motion and/or the position of one or more connecting elements V and are linked to the control of the forward thrust device 5.

I claim:

1. A device for supplying connecting elements to a processing unit, the device comprising:
    a conveying section for holding the connecting elements;
    a forward thrust element for pushing a connecting element forward in a conveying direction to the processing unit, said forward thrust element having a flap movable into said conveying section, said flap having a forward thrust surface being held in said conveying section by a passively acting force and said flap being moveable out of said conveying section by the connecting element supplied to said conveying section;
    a sensor for registering a position and/or movement of said flap, said sensor operatively connected to said flap; and
    a stopping element disposed after said flap in the conveying direction, in or on said conveying section.

2. The device according to claim 1, further comprising a passively acting actuating element producing the passively acting force that urges said flap into said conveying section.

3. The device according to claim 2, wherein said passively acting actuating element is a spring element.

4. The device according to claim 1, wherein said flap has a ramp which rises in the conveying direction and is bounded at an end by said forward thrust surface.

5. The device according to claim 1, wherein on a side opposite said forward thrust surface, said flap is held outside said conveying section such that said flap can pivot on an axis of rotation.

6. The device according to claim 1, further comprising a carriage, said flap is mounted on said carriage and said carriage can be moved parallel to said conveying section.

7. The device according to claim 6, further comprising a reciprocating element connected to and moving said carriage.

8. The device according to claim 1, wherein an activation of said forward thrust element is synchronized with the processing unit.

9. The device according to claim 1, further comprising a supply appliance for magazining and supplying the connecting elements.

10. The device according to claim 9, further comprising a hose as a supply line connected between said supply appliance and said forward thrust device, said hose supplying the connecting elements piece by piece.

11. The device according to claim 10, further comprising a connecting/catching module for the connecting element supplied, and interconnected between said supply appliance and said forward thrust device.

12. The device according to claim 10, further comprising a connecting/catching module for the connecting element supplied, interconnected between said hose and said forward thrust device.

13. The device according to claim 9, further comprising a control unit for controlling operating processes of the device.

14. The device according to claim 13, wherein said forward thrust element and said conveying section are parts of a press;
    further comprising a plurality of lines, said control unit is disposed on said supply appliance, and said supply appliance and said press are connected to each other by said plurality of lines.

15. The device according to claim 14, wherein said plurality of lines include a signal line and a punch head control line.

16. The device according to claim 14, wherein said operating processes include synchronization of said supply appliance with said forward thrust device and/or a cycling of said press.

17. The device according to claim 1, wherein:
    the processing unit is a press having a setting head; and
    the connecting elements are nuts supplied to the setting head of the press.

18. A method for supplying a connecting element to a processing unit, which comprises the following steps:
    providing the device according to claim 1;
    shooting pneumatically the connecting element into the conveying section, the shooting of the connecting element shooting into the conveying section displaces the flap that engages in the conveying section;
    stopping the connecting element in the conveying section after the flap;
    after a passage of the connecting element, placing the flap again in a position engaging in the conveying section; and
    carrying out a further forward thrust of the connecting element in the conveying section by the flap, in a manner synchronized with the processing unit.

* * * * *